United States Patent [19]

Darbo

[11] 4,211,206
[45] Jul. 8, 1980

[54] PORTABLE COOKING GRILL

[75] Inventor: Rolf E. Darbo, Madison, Wis.

[73] Assignee: Portable Cookery, Inc., Wheaton, Ill.

[21] Appl. No.: 676,699

[22] Filed: Apr. 14, 1976

[51] Int. Cl.² .................. F24B 3/00; A47J 33/00
[52] U.S. Cl. ................. 126/9 R; 126/25 R; 99/449; 220/6
[58] Field of Search .......... 99/449, 324, 339–340, 99/349, 379–380, 385, 400, 421, 446, 450; 126/9 R, 9 A, 9 B, 25, 29–30, 38, 163; 211/60, 85; 220/4, 6, 7; 248/500, 505, 506; 24/261 R; 16/110, 114

[56] References Cited

U.S. PATENT DOCUMENTS

| | | | |
|---|---|---|---|
| 803,200 | 10/1905 | Stripe | 220/6 |
| 808,766 | 1/1906 | Lehmann | 126/9 A UX |
| 1,109,391 | 9/1914 | Billings et al. | 220/6 |
| 2,488,014 | 11/1949 | Higman | 126/9 A UX |
| 2,530,849 | 11/1950 | Wyatt et al. | 220/4 F |
| 2,939,384 | 6/1960 | Vinson | 99/421 HH |
| 3,109,420 | 11/1963 | Ott et al. | 126/9 R |
| 3,230,948 | 1/1966 | Schmitt | 99/421 HH X |
| 3,447,530 | 6/1969 | Santeramo | 126/9 R X |
| 3,581,731 | 6/1971 | Schulze | 126/25 R X |
| 3,858,495 | 1/1975 | Gotwalt | 99/421 HH |
| 3,892,222 | 7/1975 | Darbo | 126/25 R X |

*Primary Examiner*—Harvey C. Hornsby
*Assistant Examiner*—Timothy F. Simone
*Attorney, Agent, or Firm*—Darbo & Vandenburgh

[57] ABSTRACT

A cooking grill using newspaper, charcoal, wood or other dry fuel has four sides hinged to a base plate to fold in upon the base. The wire grid holds and locks the folded stack together and provides a handle for the pack. Provision is made for the optional use of a charcoal grate at one of several alternative levels and the wire grid has two possible levels. Provision is also made for spit broiling. One side or two adjacent sides may be opened outwardly to provide convenient access for fueling and a fireplace effect which can provide heat for a reflecting oven.

13 Claims, 15 Drawing Figures

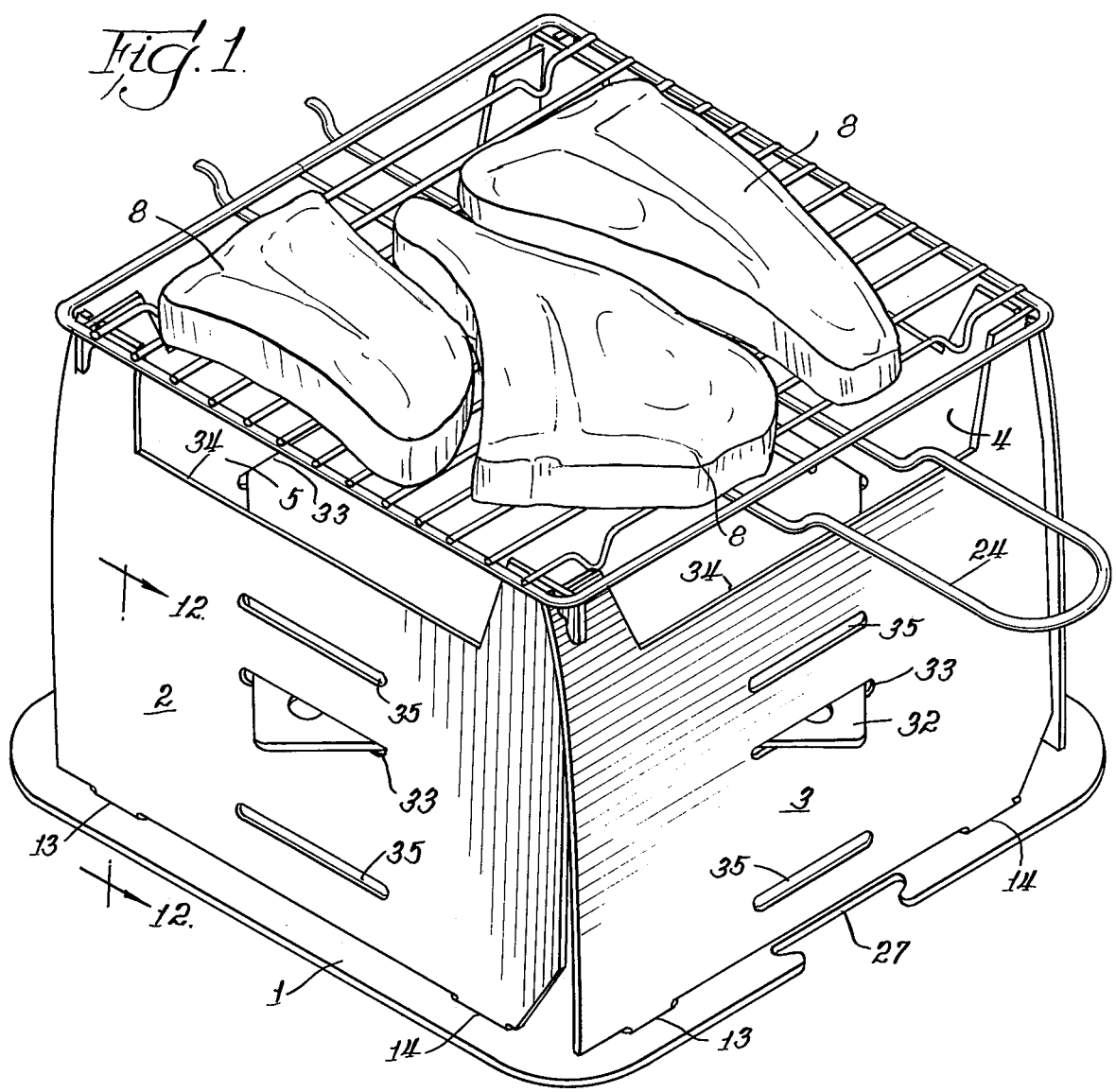
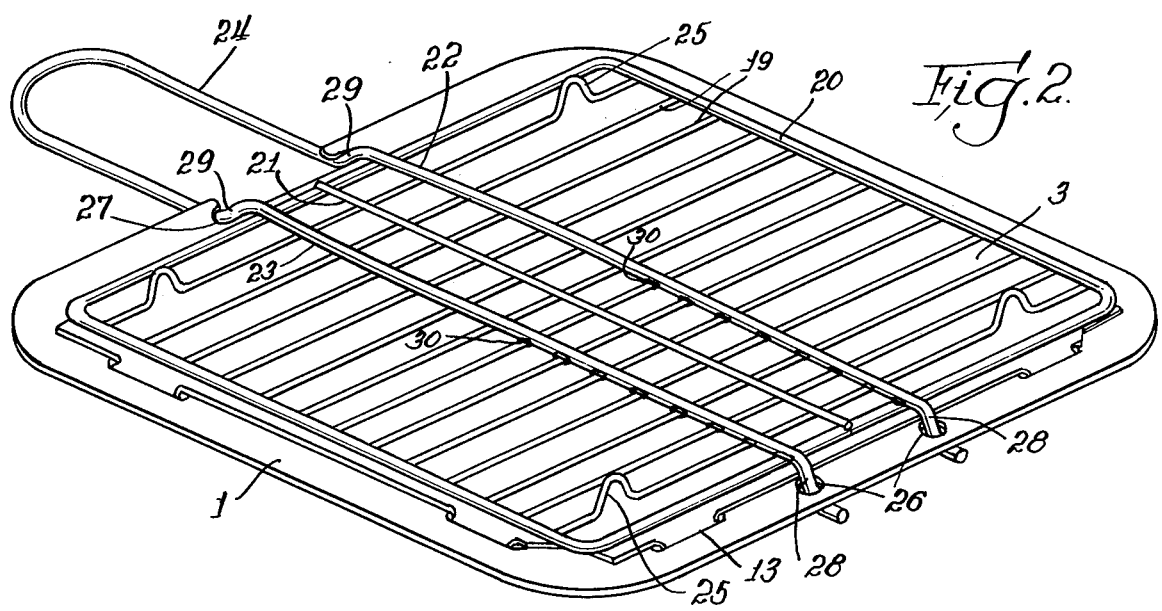

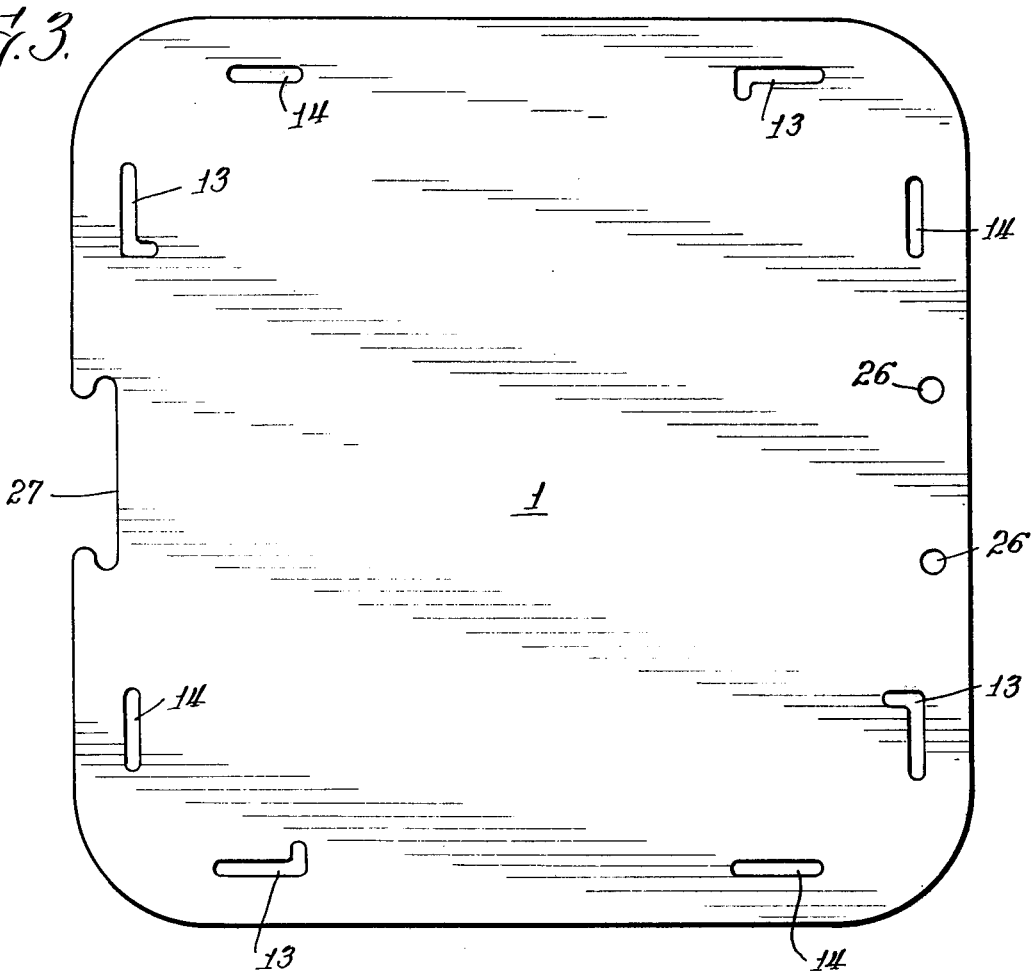
Fig. 3.
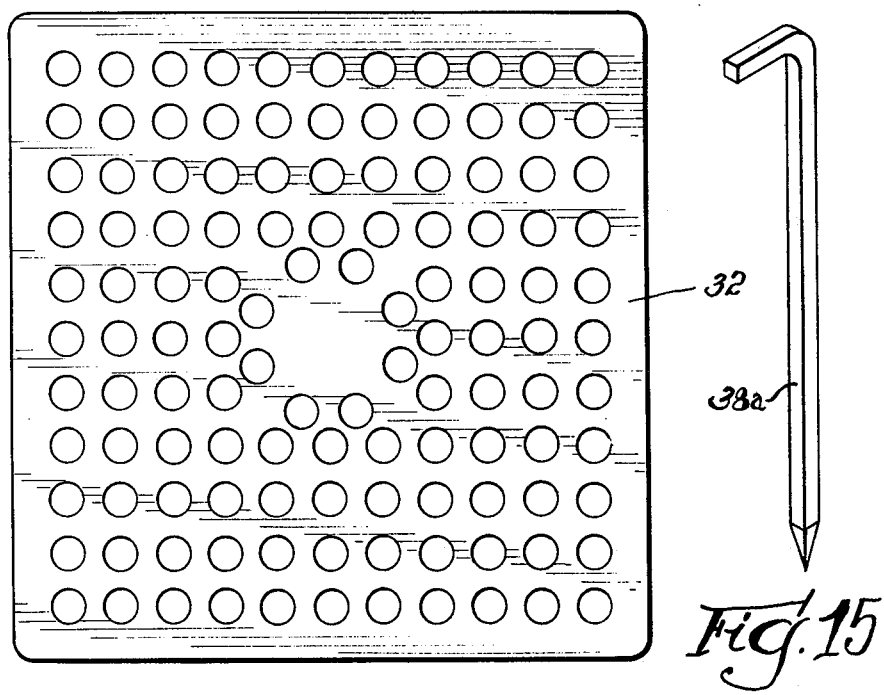
Fig. 4.
Fig. 15.

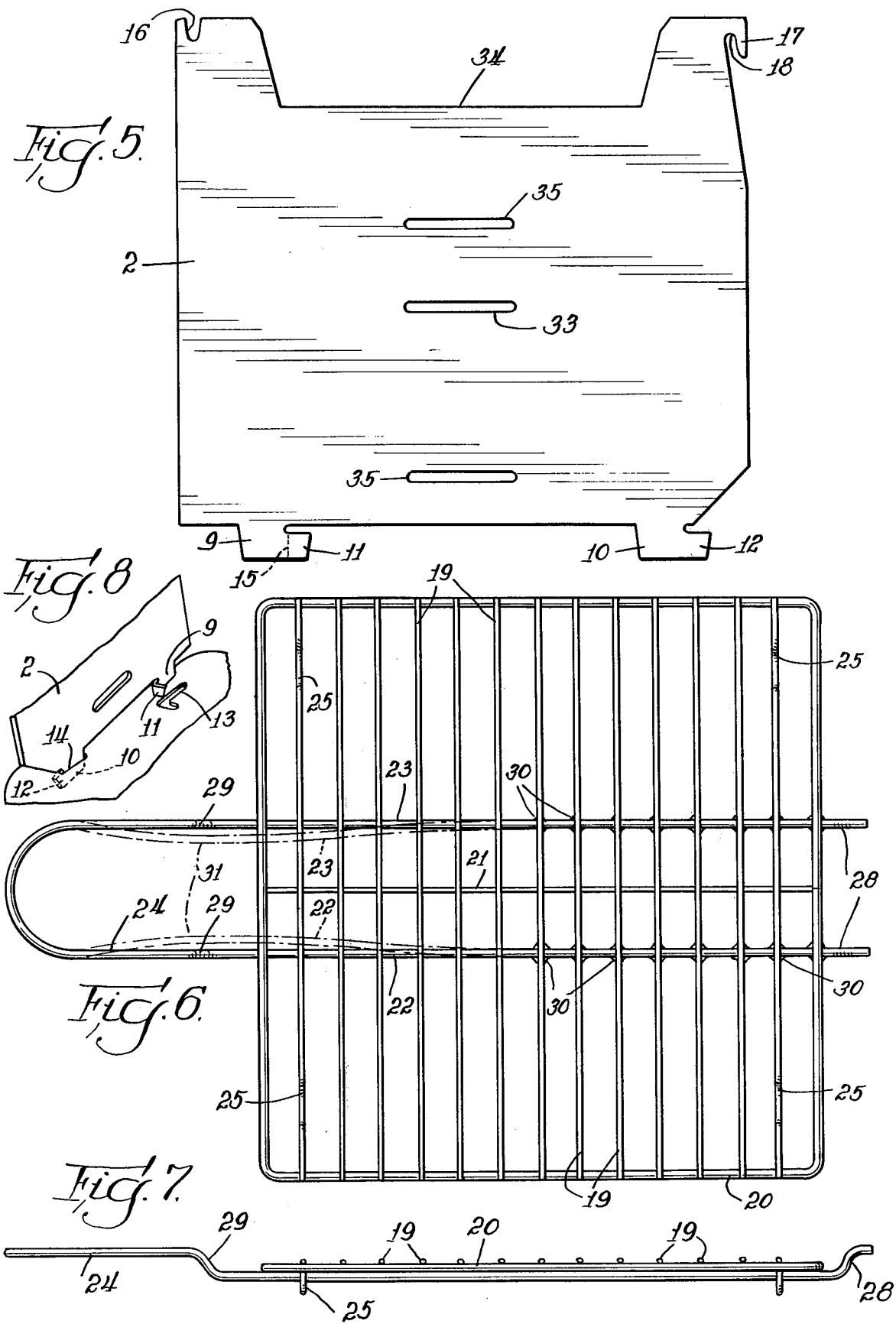

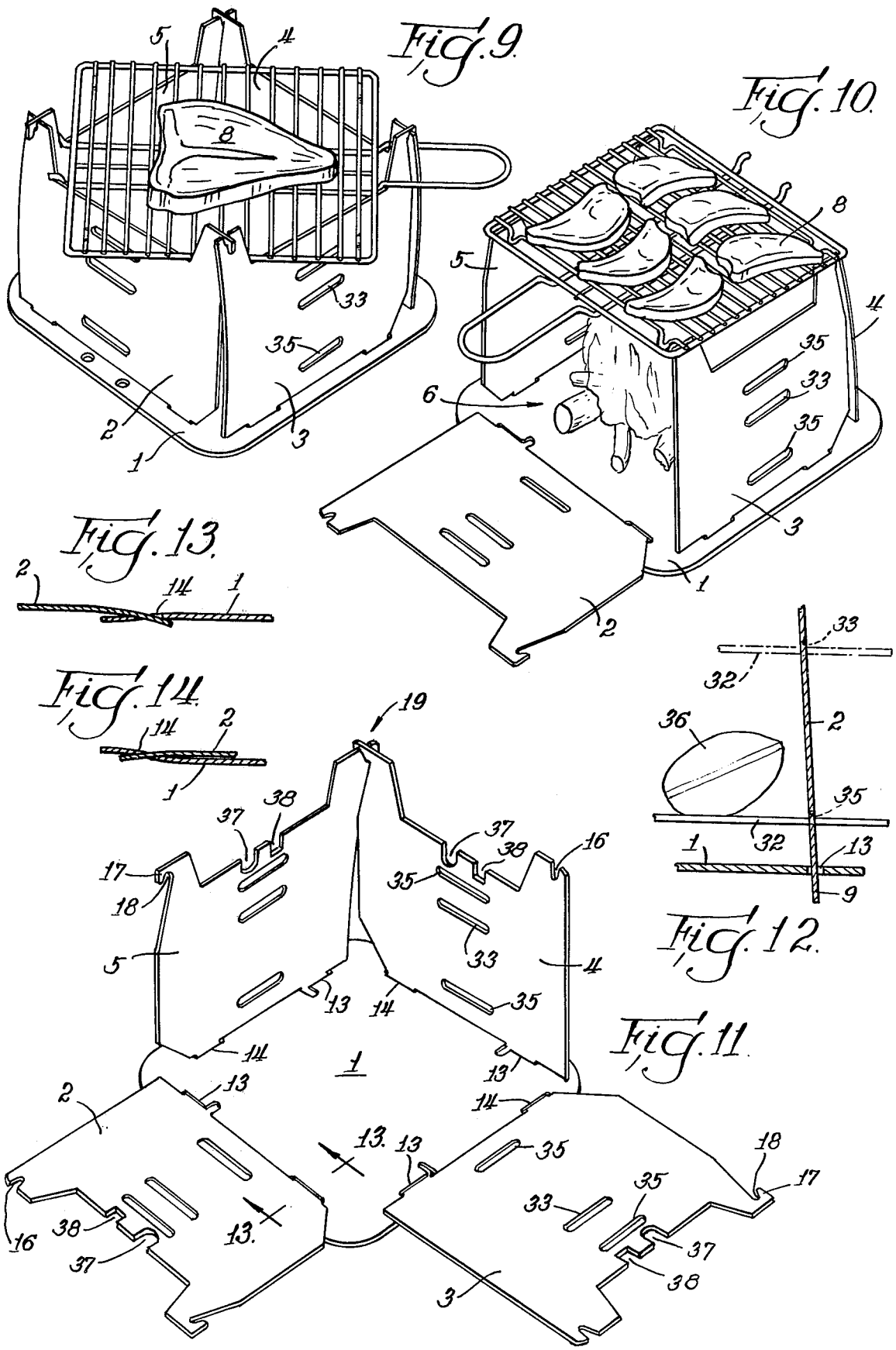

PORTABLE COOKING GRILL

BACKGROUND AND SUMMARY OF THE INVENTION

Broiling meat and other types of cooking directly over fire has become very popular whether in conjunction with camping, back packing and other outdoor recreational or living activities, on the patio or in the backyard of homes, on porches of apartment houses, and even indoors in fireplaces. A wide variety of stoves, grills and other types of cooking equipment is available, including very elaborate cooking apparatus for the charcoal broiling connoisseurs.

The fuel chiefly used in such direct heat cooking apparatus is charcoal. Wood and dry grass have also been used and, more recently, it has been demonstrated that crumpled newspaper makes a very satisfactory fuel for this type of cooking. The use of newspaper has many advantages, including ready availability and no cost. In most households, old newspapers pose a disposal problem and their use as fuel contributes to the solution of this problem and conserves other forms of energy providing materials.

To a limited extent, cooking grills small enough to be considered portable for camping purposes and the like have been made available. Some, again to a limited extent, have been designed to be reduced in size by partial disassembly, folding, telescoping, etc. for somewhat improved portability.

The principal object of the present invention is to provide a cooking grill which is adapted to use any acceptable type of solid fuel, is large and sturdy enough to cook a substantial batch of meat or other food or support a coffee pot and saucepan, and which may be folded to a compact, self-locking pack for storage and portability.

More specifically, the object is to provide a cooking grill having, for example, a grid area of about one square foot which may be folded to a pack about one foot square and one-half inch thick and having a weight of approximately three and one-half pounds.

A further object is to provide such a cooking grill with a wire, food supporting grid which also serves to hold and lock the folded pack together and provide a handle for hanging or carrying purposes.

Another object is to provide such a cooking grill in which provision is made for supporting the wire grill at either of two different levels above the fire.

Another object is to provide for the optional use of a charcoal grate in such a grill and to provide means for supporting the charcoal grate at one of several possible levels below the wire grid.

Another object is to provide such a cooking grill in which one of the side walls or two adjoining side walls may be hinged outwardly to lie flat on the ground or other grill supporting surface to provide a fireplace effect or a heat source for a reflecting oven.

A further object is to provide a special hinge design by which the side walls of the grill are secured respectively to the four sides of the base of the grill with full freedom to hinge inwardly to lie flat upon the base or upon other side walls of the grill to fold the same into a pack, or to lie flat outwardly.

From another viewpoint, the present invention represents a very substantial improvement over the folding combined broiler, oven and stove of Rolf E. Darbo U.S. Pat. No. 3,892,222, dated July 5, 1975 in that it is more versatile in use and, of major importance, it is simpler in construction, lighter in weight, and folds into a portable pack approximately only half of the thickness of the folded broiler of the patent. Additional features and achievements of the present invention will become apparent as the description of the cooking grill proceeds.

DESCRIPTION OF THE DRAWINGS

In the accompanying drawings,

FIG. 1 is a perspective view of the assembled cooking grill of the invention;

FIG. 2 is a perspective view of the cooking grill folded and locked together for carrying or storage;

FIG. 3 is a plan view of the base plate of the cooking grill;

FIG. 4 is a plan view of the optional charcoal grate;

FIG. 5 is a plan view of one of the side walls of the cooking grill after the locking tab is turned to hold the side in position upon the base;

FIG. 6 is a plan view of the wire grid;

FIG. 7 is a side view of the wire grid of FIG. 6;

FIG. 8 is a detail view, in perspective, showing the bottom portion of one side of the cooking grill in the process of assembly;

FIG. 9 is a perspective view of the cooking grill showing the wire grid at its lower level;

FIG. 10 is a perspective view of the cooking grill with one side open;

FIG. 11 is a perspective view of the cooking grill with two adjoining sides open to form a corner fireplace arrangement and showing an optional additional feature;

FIG. 12 is a detail view in cross section taken at the line 12—12 of FIG. 1;

FIG. 13 is a detail view in cross section taken at the line 13—13 of FIG. 11 and showing the arrangement of parts at the hinge with one side open as in FIG. 10;

FIG. 14 is a detail view in cross section similar to that of FIG. 13 but showing the relative positions of the hinge members when the side wall is folded in flat upon the base plate to form the pack shown in FIG. 2, and FIG. 15 shows a spit square in cross-section.

DESCRIPTION OF SPECIFIC EMBODIMENTS

As shown fully assembled and in use in FIGS. 1 and 9, the portable cooking grill comprises a base plate 1 and four sides 2, 3, 4 and 5 to define a firebox 6. A wire grid 7 rests upon the side walls and spans the open top of the grill to support meat 8 or other food for cooking.

Each of the four side walls is fastened to the base plate along one side thereof by means of a special hinge construction which permits each side wall to be folded inwardly over the base plate with or without one or more of the other side walls between and lie substantially flat so that the folded grill comprises a stack of five flat sheets with substantially no space between them.

The hinge connecting the bottom of each side wall with the base plate comprises a pair of tongues 9 and 10 spaced apart and extending down beyond the bottom edge of the side wall, each tongue having a retaining tab 11 and 12 extending laterally in the same direction from the respective tongues as is shown in FIG. 5. Base plate 1 is provided with pairs of slots 13 and 14 which are spaced apart and sized to loosely receive the tongues 9 and 10, respectively. The width of each tongue with its retaining tab is greater than the length of the slot through which the tongue extends so that the tongues are retained in position in the slots to form hinges.

Base plate 1 is shown in FIG. 3 as it is stamped out from sheet metal, preferably aluminum coated steel, approximately 26 gauge. The four side walls are identical and may also be produced by stamping from, preferably, aluminum coated steel, approximately 28 gauge. As illustrated in FIG. 5 the stamping is shown after assembly with a base plate in that tab 11, which in the formed stamping is bent at right angles along dotted line 15 as shown in the detail view, FIG. 8, is bent to the plane of tongue 9 as an extension thereof. The manner of assembly of a side wall stamping is indicated in this detail view. Leading with tab 12, tongue 10 is first inserted into slot 14 after which tongue 9 with its retaining tab 11 is lowered into and through L-shaped slot 13 and the tab is then bent to lie in the plane of tongue 9 as illustrated in FIG. 5. Side wall 2 is thus locked into position in relation to base plate 1 as the hinge is formed. The same procedure is followed to hingedly attach each of the four side walls to the base plate.

This hinge construction is especially designed to fill the needs of the portable cooking grill in that it permits the side walls to fold inwardly (or outwardly as will be seen) and lie flat upon either the base plate or another side wall or walls with substantially no space left between confronting surfaces so that the folded grill is essentially a stack of metal sheets representing the ultimate in compactness.

The relationship of the two members which make up the hinges when the side walls are turned outwardly or inwardly is shown in the detail views of FIGS. 13 and 14. In FIG. 14, side wall 2 is seen to lie substantially flat upon the base plate 1 as when the grill is folded for carrying or storing. In FIG. 13, the parts of the hinge are shown as they relate to each other when side wall 2 is opened outwardly as shown in FIGS. 10 and 11. Slot 14 is sufficiently wide to permit the range of pivoting movement between the two extremes with only an inconsequential amount of bending as the side wall approaches the base plate or the ground or other support for the grill.

An interlocking system of hooks and notches is provided to fasten adjacent side walls together and hold them erect to form the firebox. As is best seen in FIGS. 5 and 11, an upwardly opening notch 16 is provided in the top edge near one side of each side wall and a hook 17 forming a downwardly opening notch 18 is provided at the opposite end of the top of the side wall. The tops of the adjacent sides of adjoining side walls are interconnected as is most clearly seen at 19, the respective parts being mutually seated in the notches and hooks to lock them together.

Preferably, the four side walls are identical, as shown, making it possible to produce them with a single set of tools. Their height must be less than the distance between opposite sets of slots in the base plate to clear opposite side walls when the unit is folded up. Also, if the side walls are to be identical, their width must be less than the distance between opposite sets of slots to avoid interference in folding the unit. This dimensioning also makes it possible to fold the unit without the necessity of following a particular sequence.

A wire grid, shown in plan and side view, respectively, in FIGS. 6 and 7, serves to support the food to be cooked over the fire in the firebox when the grill is assembled as shown, for example, in FIGS. 1, 9 and 10. The grid also serves as retaining means for holding and latching the folded grill together, as shown in FIG. 2, and to provide a handle for carrying and a hanger for storing the folded grill. The usual crosswires 19 are welded at their ends to the heavy wire frame 20 and an additional strengthening wire 21 is welded to the grid wires. Extensions 22 and 23 of the U-shaped handle 24 are welded to the wires 19 of the grid remote from the handle, leaving the portions of these extensions which are near to the handle unattached to the grid wires and thus free to move laterally for purposes which will be described. The four loops 25 may optionally be provided in the outer grid wires 19, if desired, to hold the grid in position upon the grill and to serve as legs when the grill is placed upon a flat surface.

To provide means for locking the folded grill pack together, a pair of spaced holes 26 are provided near one side of the base plate 1 and an open-sided slot 27 is provided in the opposite side of the base plate. The holes and open-sided slot are nearer to the edges of the base plate than are the slots 13 and 14 so that they are not covered by the side walls when the walls are folded in upon the base plate and upon each other as shown in FIG. 2. To accommodate the thickness of the stack of folded side walls and the grid, the intermediate portion of extensions 22 and 23 of the handle which overlies the grid are offset as shown. The steps 28 at the distal ends of the handle extension wires 22 provide means for hooking these ends to the base plate through holes 26 and the steps 29 at the handle provide latches which fit snugly into the ends of the open-sided slot 27 to secure the grid assembly to the base plate. With this arrangement, the folded grill is locked together and a handle is provided for carrying the folded grill or hanging it up for storage.

To permit the movement necessary to latch and unlatch the grid and base plate as described, the extension wires 22 are welded to only the grid wires 19 farthest from the handle as at 30 (FIGS. 2 and 6), leaving the handle wires 22 and 23 unattached to the grid wires 19 which are closest to the handle. By grasping the handle and squeezing the two side wires together, the resilient wires are flexed to the position shown by dot-dash lines 31 in FIG. 6. When thus retracted, the handle will pass through the opening at the side of slot 27. Once in position within the slot, the squeezing pressure is released and the wires spring outwardly to nest in latched position in the slot.

Any available and suitable solid fuel may be used with the portable cooking grill. If paper, such as newspaper, is to be used, it may be crumpled and lightly pressed into balls and placed on the base plate within the firebox defined by the side walls. The heat from the burning paper serves to broil meat or otherwise cook food placed directly on the grid or contained in pans or pots supported upon the grid. The chimney effect of the burning fuel creates a draft with air passing into the firebox through the spaces between adjacent side walls. When meat is being broiled, fat drippings supplement the fuel. If more than the initial charge of fuel is needed to complete the cooking, additional balls of crumpled paper may be tossed into the firebox either by lifting the grid out of the way for the purpose or, as will be explained, through an open side.

To adapt the grill to the efficient use of charcoal as a fuel, an apertured or otherwise open grate 32 may be provided as a support for the charcoal. To support this grate with space below it in the firebox for improved draft effect, slots 33 are provided in the side walls. The corners of the grate extend through these slots, as shown in FIG. 1, and the grate is thus supported by the side walls. This grate is laid between parts of the stack when the grill is folded up and requires very little space.

It is usually desirable to provide means for adjusting the intensity of the heat either to adapt the cooking technique to the requirements of particular foods and types of cooking or to increase or decrease the effective heat in the course of the cooking of a particular food. To this end, provision is made to increase or decrease the distance between the fire and the food by changing the level of the grid and/or selecting one of the several available levels for the grate 32. By cutting out the middle portions of the tops of the side walls recesses 34 are provided which are sufficiently wide to accommodate the corners of the wire grid when the grid is rotated forty-five degrees as shown in FIG. 9. In this position, the grid rests at a lower level upon the bottom edges of the recesses, the wires forming handles 24 being far enough apart to straddle the interlocked top portions of adjacent side walls as shown in FIG. 9. To permit adjustment of the level of the fire, additional slots 35 are provided for alternative use in supporting grate 32. In the detail view of FIG. 12, grate 32 is shown at its lowest level with space still allowed underneath it for draft to provide vigorous combustion of the charcoal 36. The next higher level is shown in dot-dash lines.

If desired, one side of the cooking grill may be left open as shown in FIG. 10 to provide a fireplace effect and also to provide access to the firebox for adding fuel without removing the grid from the top of the grill. The hinge construction permits the side wall to lay out flat in front of the grill. With one side open, the grill structure also supplies an efficient source of heat for a reflecting oven for baking purposes. If a more open fire with shelter from wind is desired, two adjacent side walls may be swung outwardly as shown in FIG. 11. For cleaning purposes, all four side walls may be laid out in this manner.

When using the grate for burning charcoal or small wood sticks or twigs, ashes may be dislodged by shaking the grate using a corner which projects to the exterior of the firepot through the slots in the side walls.

To assemble the grill for use from the folded pack as shown in FIG. 2, the handle is grasped and the two sides squeezed together to release the handle wires from the open slot after which the handle may be raised sufficiently to permit withdrawal of the ends of the handle wire extensions from the holes in the base plate. The side walls may then be raised to upright position, the interlocking being accomplished by flexing the walls sufficiently to effect the entry of the respective parts into the cooperating notches. If the grate is to be used, it is inserted into the slots at the desired level as the side walls are erected. The grid is then placed on top of the firebox formed by the assembled side walls at one or the other of the two levels as desired for the particular cooking operation.

To fold and pack the grill, the procedure is reversed. After removing the grid, the side walls are separated from each other by flexing them sufficiently to separate the interlocking parts. The side walls are swung in on top of the base plate and each other without regard to any particular sequence. The grate may be interleaved at any position in the stack. This pack is then locked together by the grid by first inserting the ends of the handle wires into the holes 26 and then squeezing the sides of the handle together to latch the grid to the base plate.

It is usually preferable to cook roasts, fowl and similar bulky shapes of meat by spit broiling. For this purpose, and for broiling shish ke-bab and the like, spit sockets 37 and 38 may be provided in the top edges of the side walls of the grill as shown in FIG. 11. Resting in a pair of opposed sockets, the meat may be continuously or occasionally rotated by means of the spit as it is broiled over the fire below. Sockets 37 are round to permit rotation therein of spits square in cross section while sockets 38 are square to retain a square spit 38a in a particular rotational position even though the meat load is rotationally unbalanced. To turn the square spit, the handle end is lifted to remove the spit from the square socket, the spit turned to the desired new position, and the spit returned to the socket. If continuous rotation is desired, the spit may be placed in two round sockets 37.

If desired, a double grid may be employed instead of the single grid shown to positively clamp the meat or other food in position while cooking and to facilitate turning to cook both sides. Such double grids are usually loosely hinged at the sides remote from the handle so that they can be opened and closed. The handles may be shaped to fit into the latch slot 27 together, if desired.

ACHIEVEMENT

The cooking grill herein described is very versatile with respect both to cooking techniques and fuel to be used. Such meats as steaks and hamburgers may be broiled upon the wire grid and roasts, fowl, shish ke-bab and the like may be spit broiled at the open top of the grill. Paper such as newspaper, charcoal, twigs and wood sticks, dry grass and the like may be efficiently used as fuel. Charcoal may be readily ignited by placing it upon the grate in an upper position and putting a few balls of crumpled newspaper underneath it and igniting the paper.

The structure can easily be cleaned by laying the side walls out flat and brushing or washing the surfaces.

The special hinge arrangement makes it possible to fold the structure together to the ultimate in compactness, essentially a stack of flat metal parts. The folded grill is about one-half inch thick and weighs approximately three and one-half pounds for maximum portability. The grid serves the triple purpose of supporting food being cooked, including pots or pans, holding the folded grill together, and providing a handle for carrying the folded grill hanging it up for storage.

I claim:

1. In a portable cooking grill having a rectilinear base plate and four identical side walls respectively hinged to the respective sides thereof and means for fastening adjoining side walls together in upright position, the hinge structures which respectively join the respective side walls to the base plate each comprising a pair of slots in said base plate spaced apart and equally spaced inwardly from and oriented parallel with one edge of the base plate, a tongue extending from the associated side wall through each of said slots in said base plate, and means for retaining each said tongue in its associated slot, said slots being sufficiently wide and said side wall being sufficiently resilient to permit the side wall to hinge inwardly to overlie the base plate in a folded position at which it is in contact with the underlying structure throughout at least most of the confronting areas, the improvement wherein the width of the side-walls is less than the distance between opposite sets of slots in said base plate whereby in folding the grill the four walls may be hinged inwardly in any sequence.

2. Structure in accordance with claim 1 and including a square grid and wherein a substantial part of the middle portions of the top edges of all of the side walls are recessed to provide horizontal supporting edges for the corners of said grid at a level lower than the top of the side walls.

3. Structure in accordance with claim 1 and including a grate, each side wall having a horizontal slot therein at a level above the grill base plate through which a portion of said grate can extend to support it at the level of said horizontal slots.

4. Structure in accordance with claim 3 wherein a plurality of vertically spaced horizontal slots are provided in each side wall whereby the grate can be supported at any of the plurality of slot levels.

5. Structure in accordance with claim 1 wherein the side walls are all hinged inwardly to form a pack with the base plate, and including means for holding said pack together, said means comprising latch means at opposite edges of said base plate and a wire cooking grid adapted for use as a pack clamp, said grid including a pair of spaced support wires extending beyond the grid at one end to form a handle and forming a pair of open hooks at the other end, said latch means comprising a pair of spaced holes in said base plate adapted to receive the ends of said open hooks therein and an open slot opposite said holes adapted to receive in latching relationship said support wires at the juncture of said handle with said grip.

6. Structure in accordance with claim 5 wherein the support wires extend across the grid at right angles to the wires forming said grid, said support wires being welded to said grid wires remote from the handle and being unattached to said grid wires near the handle whereby said support wires may be flexed toward each other at the handle end to permit entry into the open slot latch means in the base plate.

7. Structure in accordance with claim 1 and including a spit having a square cross section and wherein each of the opposite side walls is provided with a pair of sockets in the top edge thereof to receive and support said spit, one of each said pair of sockets being round and the other socket of said pair being square to hold said square spit against rotation.

8. In a portable cooking grill having a rectilinear base plate, four side walls respectively hinged to the respective sides of said base plate, means for fastening adjoining side walls together in upright position, and a wire cooking grid; the improvements wherein the base plate is square and the four side walls are identical and substantially square, the base plate having a pair of slots equally spaced inwardly from each edge of the base plate and spaced apart, each side wall having a pair of tongues integral therewith and respectively extending through said slots to form hinges therewith, means for retaining each said tongue in its associated slot, said slots being sufficiently wide and the side walls being sufficiently resilient to permit each side wall to hinge inwardly and outwardly to substantially the plane of the base plate, the height and width of each side wall being less than the distance between the pairs of slots at opposite edges of the base plate, each side wall having a downwardly opening hook formed on one side at the top thereof and an upwardly opening notch formed in the other side at the top thereof to provide means for fastening adjoining side walls together in upright position, and means for holding the grill together when all four side walls are hinged inwardly to form a pack, said last mentioned means comprising a U-shaped clamping member of resilient wire extending across said pack, the loop end of said member extending beyond said pack to form a handle and the distal ends being formed as open hooks extending beyond said pack, the base plate having a pair of spaced holes near one edge thereof located to respectively receive said open hooks therein and an open slot opposite said holes adapted to receive in latching relationship said clamping member at the juncture of said handle with said pack.

9. Structure in accordance with claim 8 wherein the clamping member is a structural part of the wire grid and is welded to the grid wires remote from the handle and unattached to the grid wires near said handle whereby the wires forming said clamping member are free to be flexed toward each other at the handle end to permit entry into the open slot latch means in the base plate.

10. Structure in accordance with claim 8 and including a grate, each side wall having a horizontal slot therein through which a portion of said grate can extend to support it at the level of said horizontal slots.

11. Structure in accordance with claim 10 wherein a plurality of vertically spaced horizontal slots are provided in the side walls whereby the grate can be supported at any of the plurality of slot levels.

12. Structure in accordance with claim 8 wherein one of each pair of slots is L-shaped and the tongue to be associated with said L-shaped slot is initially formed with a tab portion extending at right angles thereto to form an L-shaped configuration corresponding to that of the L-shaped slot to pass therethrough, said tab portion in the assembled hinge extending in the plane of said tongue.

13. Structure in accordance with claim 8 wherein the middle portions of the tops of the side walls are recessed to provide supporting edges for a grid at a level lower than the top of the side walls.

* * * * *